United States Patent [19]

Takano et al.

[11] Patent Number: 4,463,391
[45] Date of Patent: Jul. 31, 1984
:::

[54] VIDEO TAPE EDITOR

[75] Inventors: Masayuki Takano, Tokyo; Masaaki Sakai, Kawasaki; Masaharu Enoki, Sagamihara, all of Japan

[73] Assignee: Sony Corporation, Tokyo, Japan

[21] Appl. No.: 306,767

[22] Filed: Sep. 29, 1981

[30] Foreign Application Priority Data

Oct. 3, 1980 [JP] Japan .................. 55-139203

[51] Int. Cl.³ ............. H04N 5/782; G11B 15/18
[52] U.S. Cl. .................. 360/14.2; 360/74.4; 360/10.2
[58] Field of Search ........ 360/10.1, 10.2, 10.3, 360/74.1, 74.4, 74.2, 71, 72.3, 72.2, 14.1, 14.2

[56] References Cited

U.S. PATENT DOCUMENTS

| | | | |
|---|---|---|---|
| 3,454,713 | 7/1969 | Yanagimachi | 360/10.3 |
| 3,557,320 | 1/1971 | Hopf | 36/10.2 |
| 3,968,518 | 7/1976 | Kihara | 36/14.2 |
| 3,974,522 | 8/1976 | Fukatsu | 360/14.2 |
| 4,210,940 | 7/1980 | Prysby | 360/14.1 |
| 4,280,146 | 7/1981 | Misaki | 360/74.1 |
| 4,325,088 | 4/1982 | Wright | 360/14.2 |

Primary Examiner—Alan Faber
Attorney, Agent, or Firm—Lewis H. Eslinger; Alvin Sinderbrand

[57] ABSTRACT

Insert and assemble editing of video signals are carried out using a VTR having helically scanning rotary record/playback heads. Following the recording of a first video signal in slant tracks on the tape, the tape is stopped at an edit point where recording of a second video signal is to commence. Then the tape is run reversely while control signals associated with the locations of the tracks are reproduced. These control signals are counted and the tape is stopped when a predetermined number of such signals have been counted. Thereafter the tape is advanced to a noiseless-still-picture position, based on a counted number of oscillations associated with rotation of the tape capstan, at which an acceptably noise-free picture is obtained, notwithstanding that the head scan of the rotary heads does not completely coincide with the slant tracks when the tape is stopped. After this, the tape is run at normal speed, and when the tape reaches the edit point, the VTR begins to record the second signal, which is at that time in step with the previously-recorded first video signal.

3 Claims, 13 Drawing Figures

FIG.7A (FG)
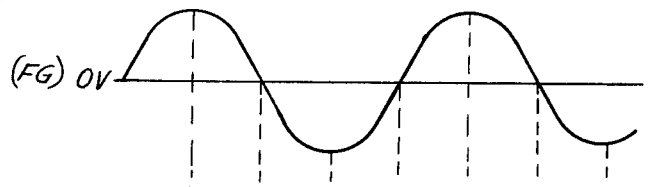
FIG.7B (Ds)
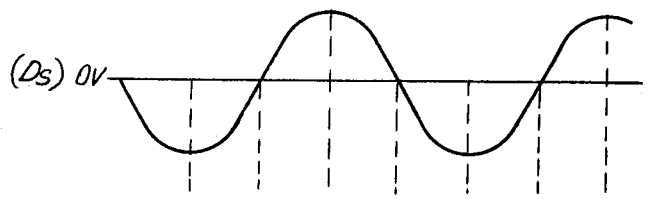
FIG.7C ($\overline{D_s}$)
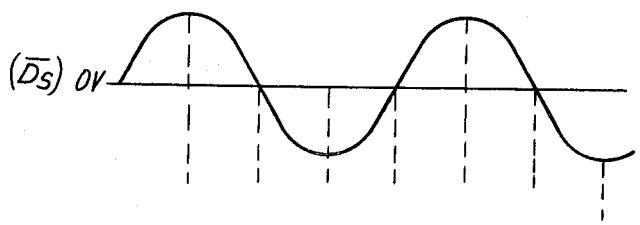
FIG.7D (FGS)
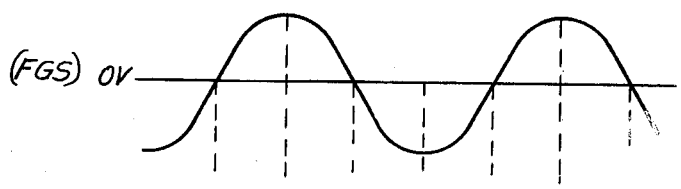
FIG.7E (SW₃)
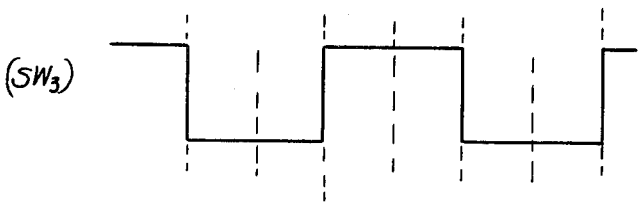
FIG.7F
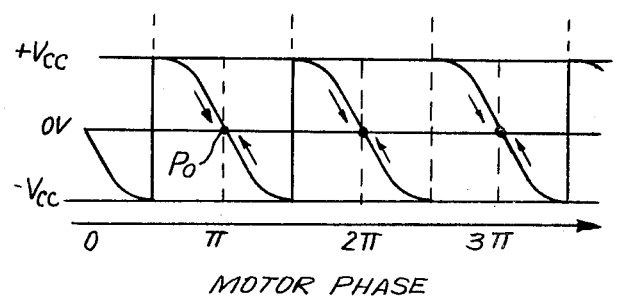
MOTOR PHASE

VIDEO TAPE EDITOR

BACKGROUND OF THE INVENTION

1. Field of the Invention

This invention relates to video recording and/or reproducing apparatus, and is more particularly directed to video tape apparatus whereby editing of a video signal may be carried out.

2. Brief Description of the Prior Art

Conventional video tape recorders (VTRs), of the type having one or more rotating heads which scan the video tape at an angle to the direction of advancement thereof, can be adapted to be set into editing modes so that a new scene is recorded continuously after a previously recorded scene. In one such mode, sometimes called an assemble mode, after one scene is recorded, the VTR is stopped, following which another scene is recorded immediately thereafter. In another mode, sometimes called an insert mode, a new scene is recorded between two scenes which are recorded previously on the tape.

In either the insert or assemble mode, the edit points, i.e., the points connecting the respective successive scenes, are determined, for example, by an operator viewing the video picture on a monitor. In a usual edit operation, the operator stops the VTR at a selected point by depressing a pause button. Then, when the operator is ready to record the new video material, the VTR is released from its pause mode and is set into its record mode, and a new video scene is recorded beginning at the edit point.

Whenever such assemble or insert recording operations are performed, care must be taken to prevent the video signal from generating confusion or noise at the edit point. For this reason, at the edit point the pitch of the recording head traces should correspond to the pitch of the tracks previously recorded on the tape. If the pitch of the recorded tracks changes discontinuously at the edit point, the reproduction of the recorded signals in the tracks around the edit point will become degraded. More particularly, when the track pitch changes, the reproducing heads will not accurately scan the recorded signal, and the reproduced picture will become noisy. Also, when the track pitch changes, the reproduced vertical and horizontal synchronizing signals will occur at a time that does not correspond to previously picked up synchronizing signals, and synchronization of the reproduced video will become unreliable.

In order to avoid changes in the track pitch at an edit point, conventional techniques take advantage of a control track recorded at one edge of the video tape, and recognize that the positions of the video tracks correspond accurately to positions of the control signal recorded on the tape. That is, in the recorded signal after editing, the pulses of the control signal have a constant pitch $\tau_c$.

In order to avoid changes in track pitch, the recording of the tracks of the new video signal should be controlled by the tracking servo system of the VTR, so that the tracks are recorded at locations determined by the recorded control signal corresponding to a previously-recorded scene, while the recording heads are rotated in synchronism with the vertical synchronizing signal contained in the new video signal.

To carry out recording under the control of the tracking servo system, the tape must be reversed for at least a short distance ahead of the edit point. Then, the new scene is recorded, beginning at the edit point, only after the tape has been advanced for that short distance. Thus, the track pitch for the new video signal matches that of the previously recorded video signal, and picture degradation or synchronization confusion is avoided at the edit point.

According to conventional editing techniques, the tape is returned mechanically for a short distance to reverse it for the above-mentioned short distance. In a typical editing technique, the VTR is stopped at or near the intended edit point, and a lever is manually actuated to energize a solenoid plunger. The plunger reversely rotates a guide roller of the VTR, and thereby loosens the tape an amount approximately 3.5 times as long as the pitch of the recorded control signal. The amount of tape so loosened is then taken up on a tension regulator to reverse the tape, relative to the heads, by the amount 3.5 times the pitch of the control signal. A timer is preset by the running time corresponding to this amount, and the timer starts the recording of the new scene the preset time after the tape is started in the forward direction. That is, the recording of the new scene is commenced automatically, under the control of the preset timer, as the tape passes the edit point.

With the conventional editing technique, as the returned amount of tape is arrived at mechanically, the tape advancement mechanism must be stringently adjusted and the preset timer must be controlled with extreme accuracy to ensure that the new video signal is commenced precisely at the edit point, and so that the rotary recording head will be accurately synchronized with the previously recorded video signals. Nevertheless, because the conventional operation is carried out mechanically, even if the timer and tape advancement mechanism are adjusted as precisely as possible, the returned amount of tape will not always be constant because of factors such as tape stretch and temperature change. Thus, the conventional technique cannot ensure that the new scene will commence precisely at a predetermined edit point.

Alternatively, it has been proposed to arrange a VTR to begin recording the new scene immediately after three occurrences of the control signal have been counted, where the tape is mechanically returned by an amount of 3.5 times the pitch of the control signal. However, in such proposed technique, because the edit point of the tape is not in any fixed relation to the control signal, there is a possibility that the tape can be stopped at the vicinity of a recorded occurrence of the control signal. If this should occur, mere vibration of the stopped video tape can cause the control head, which picks up the control signal, to misinterpret a single occurrence thereof as a multiple occurrence. Thus, when the advancement of the tape is commenced immediately prior to the recording of the new scene, a miscount of the control signal may result in the new scene being recorded at the wrong place on the video tape, and, perhaps also, before the phase of the rotary head is properly adjusted.

Furthermore, when the video tape is stopped in advance of the edit point to await the recording of the new signal, the angle of the recording/reproducing head trace relative to the tape is different from the angle thereof when the video tape is being advanced at normal speed. As a result, the recorded tracks on the tape will not be scanned precisely. A noisy reproduced video signal can result unless the trace of the recording/reproducing head is caused to intersect approximately the middle of the recorded track at which the tape is stopped. Unfortunately, no provision has previously been incorporated in an editing system for a VTR to ensure a substantially noise-free signal is reproduced when the VTR is stopped during an editing operation.

Completely electronic video tape editing systems have been proposed to deal with one or more of the above-mentioned problems. However, any previously proposed all-electronic systems have been extremely complex and hence unduly expensive.

OBJECTS AND SUMMARY OF THE INVENTION

It is an object of the present invention to provide a simple and straightforward technique, including a method of, and apparatus for editing a video signal in a manner that avoids the problems encountered with conventional techniques.

It is another object of this invention to provide a simple and straightforward editing technique utilizing the servo mechanism associated with the tape advancement mechanism to control the sequence of steps involved in the editing techique.

It is still another object of this invention to provide an editing technique wherein recording of a new video signal can be commenced precisely at a selected edit point and in which the track pitch of the recorded video signals does not change at the edit point.

It is a further object of this invention to provide an editing technique in which once an edit point is determined, the video tape is halted in advance at a point at which the video picture will be reproduced substantially free of noise, notwithstanding that the trace of the reproducing head is at an angle to the recording track of the video signal at such point.

Accordingly, a method of editing a video signal according to this invention entails the use of a video tape recording and reproducing device in which the video signal is recorded on parallel tracks disposed at an angle to the direction of advancement of the tape while control signals are recorded in a track parallel to the direction of advancement. A rotary recording and playback head moves across the tape to define a head trace parallel to the tracks when the tape is advanced at its normal speed, but disposed at an angle thereto when the tape is held stationary. A stationary control head picks up the control signal, and recurring signals are produced, for example in association with a capstan servo of the device, related to the control signal. In this method, the new video signal can be recorded following an existing video signal previously recorded on the tape, by following the steps of stopping the tape at a selected edit point at which recording of the new video signal is to commence; running the tape reversely while reproducing the control signal therefrom; counting occurrences of the recurring signal based on the control signal; and stopping the tape at a predetermined position relative to the edit point, based on the occurrences of the recurring signal, at which the previously-recorded existing video signal can be reproduced without objectionable noise, notwithstanding that the trace of the head does not completely coincide with the track being picked up thereby. Thereafter, when the new video signal is to be recorded, the tape is run forward at normal speed while measuring advancement of the tape, for example, by counting occurrences of the above-mentioned recurring signal. Then the recording of the new video signal is commenced at a predetermined distance from the point at which the tape has been stopped, namely, at the previously selected edit point.

Apparatus for automatically carrying out the above method can favorably incorporate a microprocessor having a ROM, in which program steps of this method are stored, a RAM, a CPU, and input-output interface circuitry. The apparatus can further include one or more counters for counting occurrences, for example, of the control signal and of a signal associated with rotation of the tape capstan.

The above and other objects, features, and advantages of this invention will become apparent from the ensuing description of a preferred embodiment, when considered in connection with the accompanying drawings.

BRIEF DESCRIPTION OF THE DRAWINGS

FIGS. 7A to 7F are waveform diagrams for explaining the operation of the circuit of FIG. 6.

DETAILED DESCRIPTION OF A PREFERRED EMBODIMENT

Figure 1A:
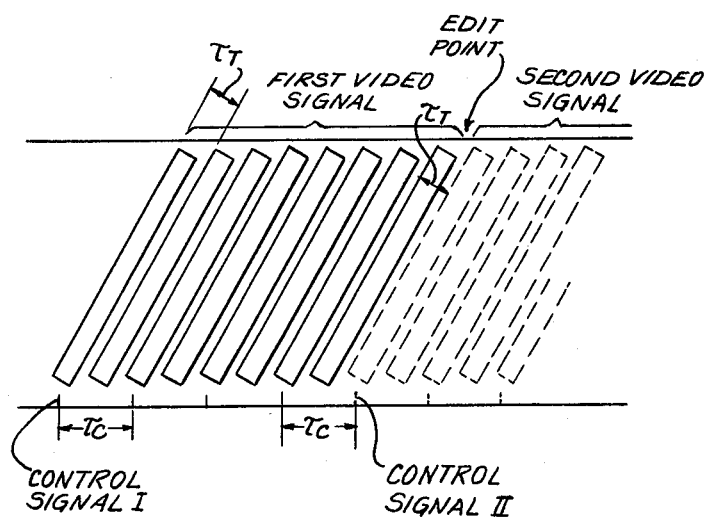
FIGS. 1A and 1B illustrate video tape in which a first video signal is recorded and a second video signal is also recorded thereafter, commencing at respective edit points.

With reference to the drawings, FIG. 1A illustrates video tape containing a video signal obtained by an ideal assemble editing process. In this view, solid-line slant blocks represent record tracks of a first video signal which had been recorded on tape prior to the recording of a second video signal, whose record tracks are illustrated as broken-line slant blocks. Here, the first video signal tracks have a pitch $\tau_T$ as do the second signal tracks. In addition, this pitch $\tau_T$ is maintained at the edit point where the second video signal commences. A control signal, recorded as a pulse in a control track along one edge of the tape, also has a constant pitch $\tau_c$. With such a recorded signal, the tape drive (or capstan) servo mechanism and the rotary head servo mechanism associated with the VTR will have no difficulty in reproducing the recorded signal, even in the vicinity of the edit point. Furthermore, the various horizontal and vertical synchronizing signals contained in the recorded second video signal will be reproduced in step with the respective synchronizing signals contained in the recorded first video signal, so that, upon playback, the edited signal will cause no particular problems in maintaining synchronization, and no noise will be generated on account of the assemble-editing of the first and second video signals.

Figure 1B:
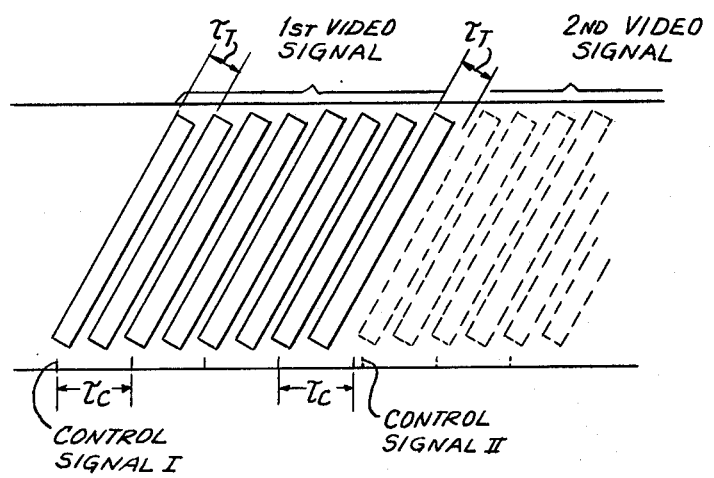

Unfortunately, a realistic assemble edit operation according to conventional techniques is likely to result in the format as illustrated in FIG. 1B, in which the pitch $\tau_T$ of the video tracks changes drastically at the edit point, and, concomitantly, the pitch $\tau_c$ of the control signal also changes at the edit point. Such a recorded signal is likely to generate picture noise and loss of synchronization upon playback when the edit point on the tape is reached.

While various techniques have been proposed, as mentioned earlier, to combat the occurrence of this discrepancy in track pitch $\tau_T$ and control signal pitch $\tau_c$ during an editing operation, such techniques have not been altogether successful. Nevertheless, the preferred apparatus according to this invention, as described below with reference to FIG. 2, can reliably produce an edited video signal having the superior format illustrated in FIG. 1A.

Figure 2:
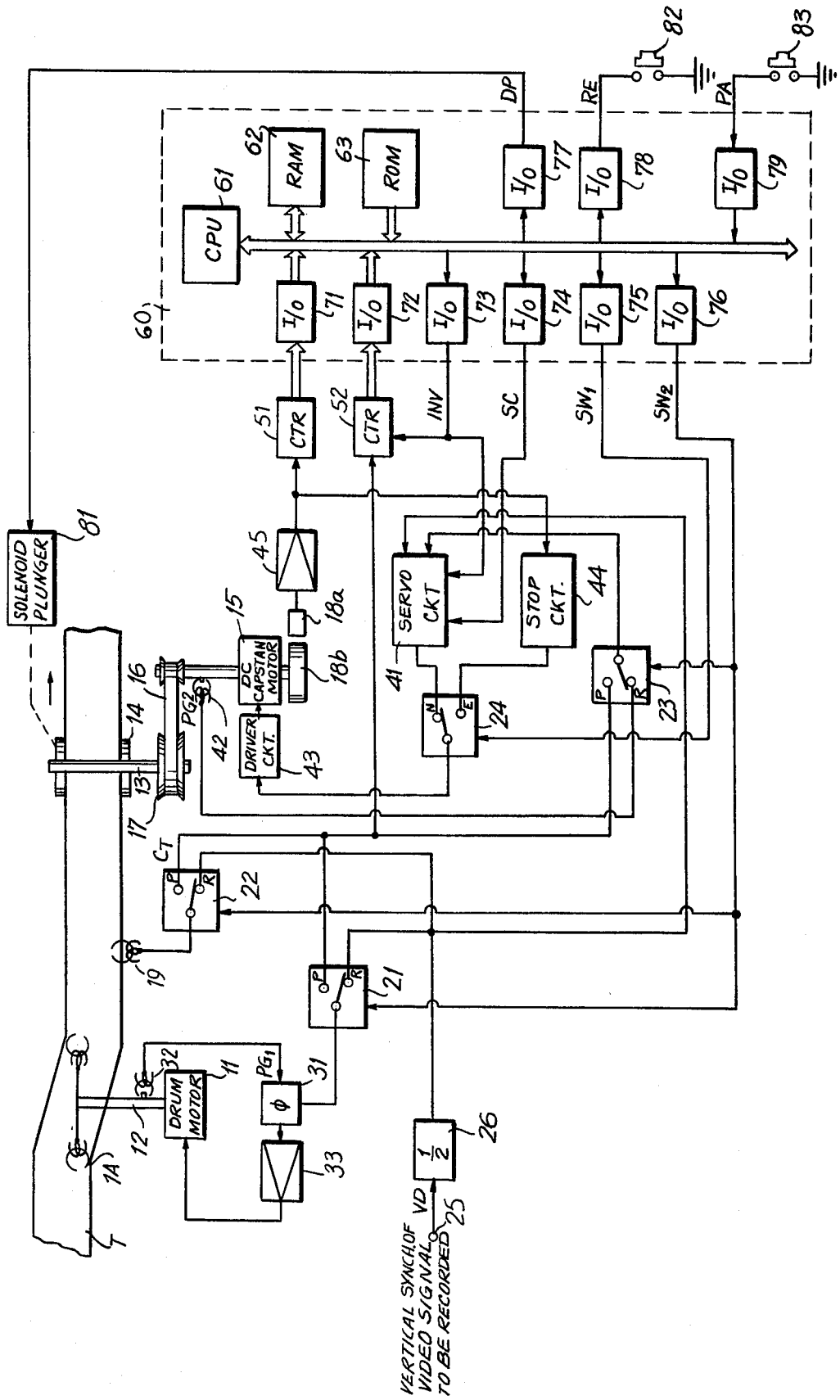
FIG. 2 is a schematic view of apparatus according to one embodiment of this invention.

As shown in FIG. 2, the apparatus of the preferred embodiment of this invention initially includes a pair of rotary recording and playback heads 1A and 1B disposed with an angle of 180° therebetween, and adapted to scan helically. A video tape T is arranged in an omega configuration around the heads 1A and 1B so that the same scan in respective slant traces to record the video signal in slant tracks thereon, and, in a playback mode, to reproduce the recorded video signal from such slant tracks.

The heads 1A and 1B are driven by a drum motor 11 coupled thereto by a drum shaft 12, at a rotary speed of 30 Hz. A tape advancement mechanism for transporting the tape includes a capstan 13 and a pinch roller 14 pressed thereagainst with the tape T therebetween. To drive the capstan 13, a DC capstan motor 15, which rotates at 30 Hz to advance the tape T at a normal speed $V_0$, is coupled to the capstan 13 by a belt drive 16. A fly-wheel 17 is associated with the capstan 13 to ensure steady rotary motion.

A frequency generator 18 associated with the capstan motor 15 includes a magnetic sensor 18a and a permanent-magnet plate 18b mounted to rotate with the capstan motor 15. The detector 18a can include a magnetoresistive arrangement, for example, as described in U.S. Pat. No. 4,053,829 to T. Maruo, and produces a sinusoidal output phase signal FG.

A fixed control head 19 is disposed at an edge of the tape in contact with a control track thereon.

Controlled switching circuits 21, 22, and 23 are each provided with a recording terminal R, a playback terminal P, and a movable common terminal. Another switching circuit 24 has a movable common terminal, a terminal N which is normally actuated and another switched terminal E which is actuated for stopping the capstan motor 15 during an edit operation.

A video synch signal input 25 is provided to receive occurrences of the video synchronizing pulses VD associated with an input video signal to be recorded, and a divide-by-two frequency divider 26 is provided thereafter to furnish pulses having half the video field rate to the terminals R of the respective switching circuits 21 and 22.

The fixed terminals P of the switching circuits 21, 22, and 23 are all coupled together.

A head drum servo includes a phase comparator 31 having one input coupled to the movable terminal of the switch 21, and another input coupled to a pulse generator 32 associated with the shaft 12 to receive a head location pulse $PG_1$ related to the rotary position of the heads 1A and 1B. The phase comparator 31 then provides a resulting error signal through a smoothing amplifier 33 to a control input of the drum motor 11 to control the speed and phase thereof.

The movable terminal of the switching circuit 22 is coupled to the control head 19. Thus, during recording, the pulses provided from the frequency divider 26 are used both to control the phase of the drum motor 11 and also to supply the control head 19 with control signal pulses $C_T$ to record in the control track of the tape. Then, during playback, the reproduced control signal pulses $C_T$ are supplied from the control head 19 through the switching circuits 22 and 21 to the phase comparator 31 to control the phase of the drum motor 11.

A capstan servo circuit 41 is also provided having one input coupled to the frequency divider 26 and to the terminal R of the switching circuit 22, and also has another input coupled to the movable terminal of the switching circuit 23. The terminal R of the latter is coupled to a pulse generator 42 associated with the capstan motor 15, and, as mentioned above, the terminal P thereof is coupled to the terminal P of the switching circuit 22. Thus, during recording, the capstan servo circuit 41 controls the frequency and phase of the capstan motor 15 on the basis of comparison of the control signal pulses $C_T$ picked up by the control head 19 with position pulses $PG_2$ picked up by the pulse generator 42. An error signal is provided from the capstan servo 41, through the switching circuit 24 and a motor drive circuit 43, to a control input of the motor 15.

A stop circuit 44 is provided having an input coupled through an amplifier 45 to the frequency generator 18, and an output coupled to the terminal E of the switching circuit 24. This stop circuit 44, which is described in greater detail later, is arranged generally as described in copending patent application Ser. No. 270,219, filed June 4, 1981, and having a common assignee herewith.

The apparatus further comprises a pair of binary counters 51 and 52 each having an input respectively coupled to the amplifier 45 and to the terminal P of the switching circuit 22, and a microprocessor 60 including a central processing unit (CPU) 61, a random access memory (RAM) 62, and a read-only memory (ROM) 63 in which are stored commands for carrying out the program described hereinafter.

A battery of input/output ports 71–79 are also provided to permit the microprocessor 60 to communicate with the elements of the apparatus as previously described. The input/output ports 71 and 72 respectively receive the contents of the two counters 51 and 52. The input/output port 73 provides a reversing signal INV to the counter 52 and also to the capstan servo circuit 41 whenever the direction of tape advancement is to be reversed. The input/output port 74 provides a speed control signal SC to the capstan servo circuit 41 to control the speed of rotation of the capstan motor 15 so that when the mode of the apparatus is changed from the reverse to the forward mode, the capstan motor will turn in the direction of tape advancement and the speed thereof will be reduced, for example, to 1/15 of normal tape speed. The input/output ports 75 and 76 provide switching control signals $SW_1$ and $SW_2$ to the switching circuit 24 and to the switching circuits 21, 22, and 23, respectively. The input/output port 77 provides a plunger drive signal DP to a solenoid plunger 81 which acts in response thereto to bias the capstan 13 and pinch roller 14 together. The input and output ports 78 and 79 are coupled to manual pushbutton switches 82 and 83 to receive a record command RE and a pause command PA respectively therefrom.

As mentioned above, according to this invention, in an assemble edit operation, it is important to run the tape T reversely from the edit point for a precise distance, and thereafter to run the tape forward and record the new video material commencing precisely at the edit point. Therefore, in order to establish a reference for this amount of tape, and also to establish the timing of the recording of the new signal, the output phase signal FG of the frequency generator 18 can be used. This output signal FG is related directly to the rotation of the capstan motor 15, and, because the tape is advanced by means of the capstan 13, the phase of the signal FG will have a direct linear relationship with the amount of tape T that is transferred. For these purposes, the amount of error introduced by tape slip can be disregarded.

In this embodiment, as described above, the pitch $\tau_c$ of the control signal pulses $C_T$ also corresponds to the amount of tape transfered, and thus, one pitch $\tau_c$ corresponds, for example, to 60 wavelengths of the signal FG. Thus, for a satisfactory measurement of the transfered amount of tape T, the control pulses $C_T$ can be used. However, in this embodiment, the principal reference signal is the phase signal FG.

Consequently, the undulations of the phase signal FG are counted by the counter 51, and the reproduced control pulses $C_T$ provided from the control head 19 through the terminal P of the switching circuit 22 are counted by the counter 52, to control jointly the editing operation carried out with the above described embodiment.

Figure 3:
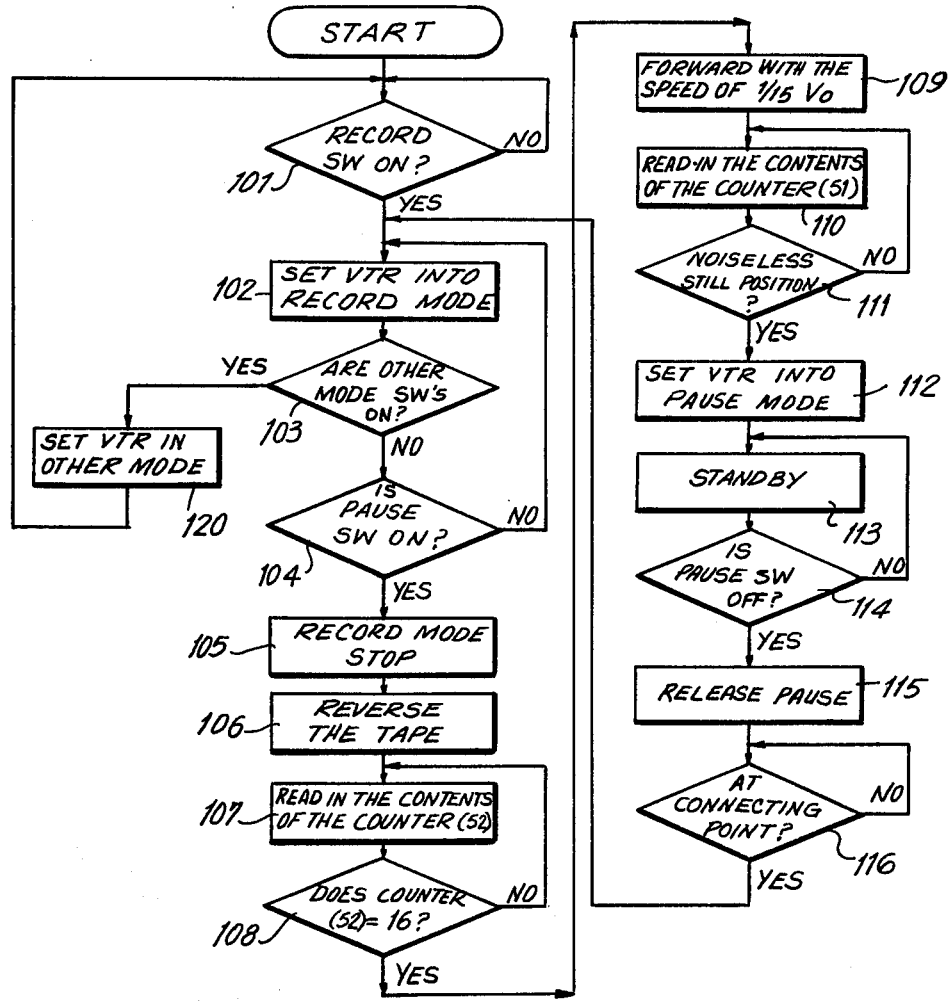
FIG. 3 is a flow chart for explaining the operation of the apparatus of FIG. 2.

FIG. 3 illustrates a flow chart of the operation program, as stored in the ROM 63, for carrying out an edit operation with this embodiment.

From the start thereof, the program proceeds to a decisional step [101]. In this step, it is determined whether the recording switch 82 has been depressed or not. If not, the step [101] is repeated; however, if the switch 82 has been depressed, the program proceeds to the next step [102].

In step [102], the VTR is set into a recording mode in response to the signal RE received by the input/output port 78. Accordingly, the input/output port 76 provides the switching signal $SW_2$ to the switching circuits 21, 22, and 23 in the sense to cause the same to switch over to their respective recording terminals R. At the same time, the input/output port 75 provides the switching signal $SW_1$ to the switching circuit 24 in the sense to cause the same to be set to its normal terminal N. As a result, the drum servo 11, 31, 32, 33, and the capstan servo 41 are conditioned for the recording of a video signal on the tape T. Then, the program proceeds to the next step [103].

In step [103], it is determined whether any other mode switches have been actuated. If another mode switch has been actuated, the program proceeds to the step [120], to be described later, but otherwise the program proceeds to the next step [104].

In step [104], it is determined whether or not the pause switch 83 has been actuated. If the switch 83 has been so actuated, the program proceeds to the next step [105], otherwise the program returns to the step [102].

In step [105], the VTR is switched out of its recording mode, and the input/output port 76 provides the signal $SW_2$ in the sense to switch over the switching circuits 21, 22, and 23 to their respective playback terminals P. At this time, a video monitor (not shown) associated with the VTR displays a picture corresponding to the new video signal which is to be recorded. Then, the program procedes to step [106].

In step [106], the capstan motor 15 is caused to rotate reversely. The rotational speed thereof is set to a speed approximately equal to the normal forward speed $V_0$ as used in normal recording and playback. In particular, the signals INV and SC provided from the input/output ports 73 and 74 to the capstan servo circuit 41 to control the rotational direction and speed of the capstan motor 15 determined so that the tape T is transported reversely at approximately the same speed that is used during playback.

During this time, the switching circuit 22 is switched over to its playback terminal P, so that control pulses $C_T$ reproduced by the control head 19 are supplied to the counter 52. This counter 52 is reset by the signal INV at the time that the direction of advancement is changed, and the contents of the counter 52 will correspond to the amount of tape that is transported reversely from the edit point.

In the next step [107], the contents of the counter 52 are read into the RAM 62.

In step [108], the CPU 61 determines whether the contents of the counter 52 are equal to sixteen, i.e., whether the tape has been reversely driven for an amount corresponding to sixteen control pulses $C_T$. If the contents equals sixteen, the program advances to the next step [109]; otherwise, the step [107] is repeated.

In step [109], the input/output ports 73 and 74 provide the respective signals INV and SC to the capstan servo circuit 41 in the sense to cause the capstan motor 15 to drive the tape T in the forward direction at a reduced speed corresponding, for example, to 1/15 of the normal speed $V_0$. This enables the capstan 14 and pinch roller 15 to recover any portion of the tape T which overruns the position corresponding to sixteen control pulses $C_T$ in advance of the selected edit point. This correction can be made easily, by automatically monitoring the contents of the counter 52. In fact, for any given VTR, the length of the overrun of the tape T is determined by the mechanical characteristics of the VTR, and will be substantially constant for all editing operations. Thus, at the end of step [109] when the overrun correction is completed, the tape T is returned to a point exactly sixteen pitches $\tau_c$ of the control signal from the point at which the pause switch 83 was actuated. At that point, the counter 51 is reset.

In the next step [110], the contents of the counter 51 are read into the RAM 62. As mentioned above, the counter 51 counts the number of undulations of the phase signal FG from the frequency generator 18, and, as mentioned above, the frequency of the phase signal FG is approximately sixty times the frequency of the control pulses $C_T$.

In step [111], it is determined whether the contents of the counter 51 equal a predetermined value corresponding to a so-called noiseless-still-picture position of the tape, as can be better explained with reference to FIG. 4. In other words, in this step it is determined whether the contents of the counter 51 correspond to a position at which the previously recorded video signal can be reproduced without objectionable noise, notwithstanding that the traces of heads 1A and 1B do not completely coincide with the track being picked up thereby.

Figure 4:
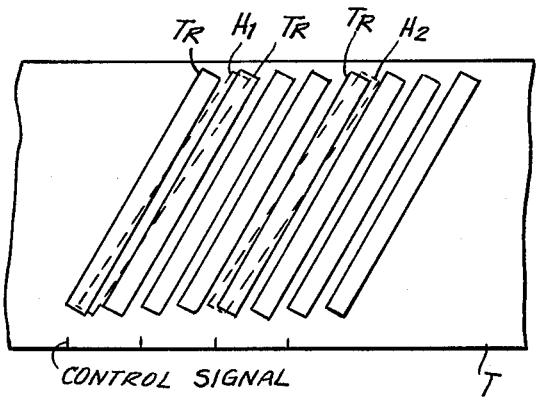
FIG. 4 shows schematically a recorded video tape being scanned at two different stop, or pause positions.

FIG. 4 illustrates the relationship between the recorded tracks $T_R$ and the head traces $H_1$ and $H_2$ when the tape T is stopped or paused. In this view, as is shown by the broken line associated therewith, the trace $H_1$ crosses two successive recorded tracks $T_R$, so that the heads 1A and 1B scan across a portion of a guard band between those tracks $T_R$ approximately during the middle of the scanning thereof.

Accordingly, noise from the guard band appears approximately at the middle of the reproduced still picture and leads to an unacceptable video presentation on the video monitor.

In contrast to this, as shown by the broken line associated with the head trace $H_2$, if the heads 1A and 1B can be caused to scan only a single recorded track $T_R$, the heads 1A and 1B scan the guard band only at the ends of the scanning period thereof, and any guard band noise appears only at the uppermost and lowermost portions of the picture presented on the monitor. This noise is generally acceptable, and normally is not even noticeable. Thus, when the tape is brought to a halt after the above-mentioned recovery of tape overrun, the tape T should be brought to a position, relative to the rotating heads 1A and 1B, wherein the traces of the heads 1A and 1B correspond to the noiseless-still-picture as represented by the trace $H_2$ in FIG. 4. Because of the fixed relationship of the control pulses $C_T$ to the recorded track $T_R$, this can be achieved by shifting the tape T to a predetermined amount from the point corresponding to the location of the sixteenth control pulse $C_T$. In this embodiment, it has been determined, based upon the motor specification and the tape format, that the position of the noiseless-still-picture is at the fifteenth wave of the output signal FG, in the forward direction from the point at which the control pulse $C_T$ is picked up.

Accordingly, in step [111], it is determined whether the contents of the counter 51, as read into the RAM 62 in the previous step [110], have reached fifteen. If the contents thereof are not equal to that value, the program returns to the step [110], but when the value of fifteen is reached, the program proceeds to the next step [112].

In step [112], the input/output port 75 provides the switching signal $SW_1$ to the switching circuit 24 in the sense to cause the latter to switch over to its terminal E. As a result, the stop circuit 44 causes the capstan motor 15 to stop approximately at the fifteenth wave of the phase signal FG from the point at which the control pulse $C_T$ is picked up by the head 19.

In the next step [113], after the capstan motor is completely stopped, the input/output port 77 cuts off the drive signal DP to the plunger 81, and the pinch roller 14 is separated from the capstan 13. This establishes a standby mode of the VTR. Following this, the input/output port 75 provides the switching signal $SW_1$ in the sense to change the switching circuit 24 back to the terminal N, and the input/output ports 73 and 74 provide their respective signals INV and SC to the capstan servo circuit 41 so that the capstan motor 15 is once again rotated in the forward direction at its normal speed $V_0$. At this time also, the input/output port 76 provides the switching signal $SW_2$ in the sense to change over the switching circuits 21, 22, and 23 to their respective recording terminals R so that the capstan motor 15 and the drum motor 11 both rotate in synchronism with the vertical synchronizing pulses VD of the new video signal to be recorded. As a result of the foregoing, the VTR is set into a pause mode, and is conditioned to await assemble recording.

In the next step [114], it is determined whether the pause switch 83 has been released, i.e., is turned off. If the pause switch 83 is not off, the program returns to the previous step [113], but if the switch 83 is off, the program proceeds to the following step [115].

In step [115], the input/output port 77 provides the signal DP therefrom to energize the solenoid plunger 81 and thereby to bias the pinch roller 14 against the capstan 13 with the tape T therebetween.

Consequently, after the step [115], the tape is advanced in the forward direction at the normal speed $V_0$. At this time, the input/output port 76 provides the switching signal $SW_2$ in the sense to change over the switching circuits 21, 22, and 23 to their respective playback terminals P, and both the drum motor 11 and the capstan motor 15 are controlled by the control pulses $C_T$ picked up by the control head 19. The apparatus of this invention is favorably arranged so that the input/output port 77 provides the signal DP in synchronism with the vertical synchronizing signal VD of the input video signal, so that when the pause switch 83 is released, the capstan servo circuit 41 receives the divided vertical synchronizing pulse VD from the output of the frequency divider 26, and such pulse is phase-compared with the control pulse $C_T$ picked up by the control head 19. Consequently, the timing of the release of the pause mode is such that the divided pulse is within the servo-lock-range of the capstan servo circuit 41 when the first reproduced control pulse $C_T$ is picked up following the energization of the plunger 81. Thus, the servo lock-in-time can be shortened to the minimum, despite the change over of the VTR from the playback mode to the recording mode thereof.

In the next step [116], it is determined whether the edit point, that is, the point at which the pause switch 83 was first depressed, has been reached. Of course, this determination can be quite easily made by monitoring the contents of the counter 42, which will correspond to the number of control pulses $C_T$ picked up by the control head 19. When the tape is at the edit point (i.e., when the contents of the counter 52 are increased by fifteen from the contents thereof at the end of the step [115] the program returns to the step [102] and the VTR begins recording the new signal on the tape T. That is, when the edit point is reached, the input/output port 76 provides the switching signal $SW_2$ to change over the switches 21, 22, and 23 to their recording terminals R. Thereafter, the drum motor 11 and the capstan motor 15 are servo controlled on the basis of the input video signals applied to the rotary heads 1A and 1B to form the new recorded tracks on the tape.

In the step [120], if any further mode switch has been selected, the VTR is placed in that respective mode. Thus, if a stop switch is turned on, the VTR is set into a stop mode in this step [120] and the program then reverts to the step [101].

Figure 5:
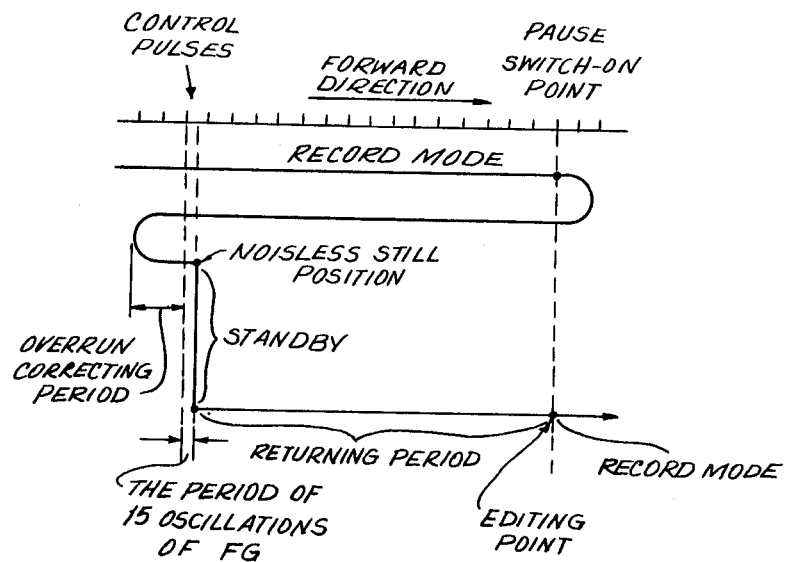
FIG. 5 is a chart showing the movement of the video tape during an assemble edit operation using the apparatus of FIG. 2.

FIG. 5 illustrates graphically the flow of the operations described above, with reference to control pulses $C_T$ as recorded on the tape. As is shown in that view, the tape is initially advanced while the VTR is in its record mode. Then, when the pause button 83 is depressed, an edit point, or pause switch-on point, is determined, and the tape is run reversely a distance corresponding to sixteen control pulses $C_T$. Thereafter, the VTR is changed over to the forward mode, to correct for overrun occurring in the reverse mode, and when the sixteenth control pulse $C_T$ is reached, the tape is advanced at slow speed to the noiseless-still-picture position thereof, and the VTR is set into a standby condition. Later, the VTR is released from its standby condition, and the tape is returned, at its normal speed, to the pause switch-point, or editing point, and the VTR is set into its record mode.

Figure 6:
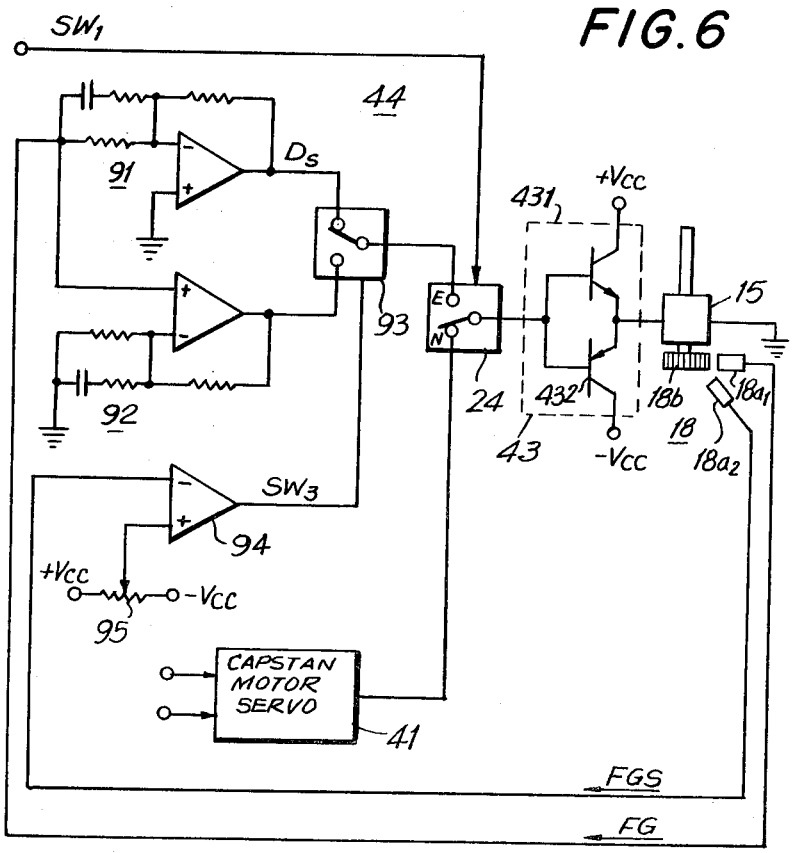
FIG. 6 is a circuit diagram showing a motor stopping circuit for use in the embodiment of FIG. 2.

It is desirable for the stop circuit 44 to cause the capstan motor to halt within one or two oscillations of the output signal FG from the noiseless-still-picture position, and, for that reason, a stop circuit can be arranged as illustrated in FIG. 6 and as explained in FIGS. 7A-7F.

In this stop circuit of FIG. 6, magnetic sensor elements $18_{a1}$ and $18_{a2}$ are provided disposed at an electrical angular separation of 90° or $\pi/2$. It should be recognized however, that these sensor elements could be arranged at any odd multiple thereof, such as 270° ($3\pi/2$) or 450° ($5\pi/2$). The sensor element $18_a$ provides the phase signal FG, as shown in FIG. 7A, which varies as the sine of the electrical angle of the shaft of the motor 15. The sensor element $18_{a2}$ supplied a second, or supplemental phase signal FGS, as shown in FIG. 7D, which lags the phase signal FS by 90° or $\pi/2$ in electrical angle.

The stop circuit 44 includes an inverting amplifier 91 formed of an operational amplifier and a bias net, and which receives the phase signal FG and provides an inverted output signal $D_s$, as shown in FIG. 7B, at its output. A non-inverting amplifier 92 is arranged in parallel with the inverting amplifier 91, and is formed of an operational amplifier and a bias net coupled thereto. The output of the non-inverting amplifier 92 provides a non-inverted output signal $\overline{D}_s$, as shown in FIG. 7C.

The stop circuit further include a comparator, here formed of an operational amplifier 94. This operational amplifier 94 has its minus input coupled to the sensor element $18_{a2}$ to receive the second phase signal FGS and has its plus input coupled to receive a reference potential. In this embodiment, the reference potential is applied from the slider of a variable resistor or potentiometer 95 whose resistive element is coupled between a positive voltage supply $+V_{cc}$ and a negative voltage supply $-V_{cc}$. The output terminal of the comparator operational amplifier 95 provides a switching signal $SW_3$ (FIG. 7E) which is high when the second phase signal FGS is below the reference voltage provided from the slider of the resistor 95, and is low whenever the phase signal FGS exceeds that reference voltage. As can be understood by comparing FIGS. 7A and 7E, the switching signal $SW_3$ changes value from high to low at the positive peaks of the phase signal FG, and changes from low to high at the negative peaks thereof.

The variable resistor 95 is provided so that the reference voltage applied to the plus input of the comparator operational amplifier 94 can be adjusted in the sense to compensate for any DC offset voltage.

A switching circuit 93 is further provided having respective input terminals coupled to the outputs of the amplifier 91 and 92, a control terminal coupled to the output of the comparator operational amplifier 95, and an output coupled to provide a brake signal $D_M$ (FIG. 7F) to the terminal E of the switching circuit 24.

In this embodiment, the brake signal $D_M$ is formed from alternate sections of the inverted signal $D_S$ and the non-inverted signal $\overline{D}_S$, as illustrated in FIG. 7F. In other words, because the switching signal $SW_3$ changes over midway between the zero-crossing points of the signals $D_S$ and $\overline{D}_S$, the resulting brake signal $D_M$ has a generally sawtooth from whose level changes from positive to negative each time the zero-crossing points $P_O$ are reached. The brake signal $D_M$ also has an average DC value of zero, so that the resulting drive current from the drive circuit 60 will also be zero whenever the switching signal $SW_1$ is applied at the switching circuit 24. Therefore, the motor will be caused to stop quickly and will come to rest at one of the stop points $P_O$, as shown in FIG. 7F.

Moreover, because there are two stop points for every cycle representing an electrical angle of $2\pi$, the motor 15 can be stopped with great precision. In this embodiment, the driving circuit 43 is formed of a pair of complementary driving transistors 431 and 432 connected in a push-pull arrangement and provides stopping current to the motor 15 in response to the switching signal $SW_1$.

Also in this embodiment, in which the speed of the capstan motor 15 is changed to 1/15 of its normal speed, it has been experimentally confirmed that the motor 15 stops within a few oscillations of the signal FG immediately following the occurrence of the switching signal $SW_1$ from the input/output port 76. Thus, the motor can be accurately stopped at a predetermined number of oscillations of signals SG by using the abovedescribed stop circuit, and the tape T can be stopped rather precisely at the noiseless-still-picture position described above.

It can be readily seen from the foregoing description that with the apparatus according to this invention, an editing point can be precisely determined with ease, and the synchronization of a new video signal to be recorded can be precisely matched with that of a signal previously recorded on the tape.

In addition, during an editing operation, when the video monitor associated with the VTR is switched to display the previously-recorded video signal, so that an operator can ensure that the edit point has been selected correctly, the monitor will display a picture that is substantially noise free and does not fatigue the eyes.

Furthermore, because a microprocessor is incorporated in the foregoing embodiment to control the same, an editing operation can be carried out semi-automatically, merely by depressing the switches 82 and 83.

It should be understood that, although the servo systems associated with the drum motor 11 and the capstan motor 15 are operated in a reproducing servo mode from the point of the noiseless-still-picture position to the editing point, the servo systems could as easily be arranged to operate in the recording mode during that period.

In the above-described embodiment, an assemble editing operation is carried out by actuating the pause switch 82 while the VTR is in its recording mode. However, if insert editing is to be carried out instead, the pause switch 82 could be actuated when the VTR is in the reproducing, or playback mode. The operation of the VTR would then be controlled otherwise in substantially the same manner as described above.

Although a particular embodiment of this invention has been described in detail herein with reference to the accompanying drawings, it is to be understood that the invention is certainly not limited to that precise embodiment, and that many changes and modifications may be effected therein by persons skilled in the art without departing from the scope or spirit of this invention as defined in appended claims.

What is claimed is:

1. A method of editing a video signal using video tape recording and reproducing apparatus in which the video signal is recorded on parallel tracks disposed at an angle to the direction of advancement of the tape and control signals are recorded in a track parallel to said direction of advancement; in which a rotary recording and playback head moves across said tape to define a head trace parallel to said tracks when the tape is advanced at normal speed and disposed at an angle to said tracks when said tape is held stationary; in which a capstan is included for pressing against said tape for advancing same and for producing an oscillating signal each time said tape is advanced a predetermined amount; and in which a new video signal is recorded following an existing video signal previously recorded on the tape, the method comprising the steps of:

stopping the tape at a point at which recording of the new video signal is to commence;

running said tape in the direction opposite to the direction of advancement thereof while reproducing said control signals therefrom;

counting occurrences of said oscillating signal;

stopping said tape at a predetermined position determined by counting a predetermined number of occurrences of said oscillating signal beyond the occurrence of a predetermined pulse provided by picking up said control signal at which said trace of the head is substantially centered in respect to one of said tracks at a midpoint along the latter so that the existing video signal previously recorded in said one track can be reproduced without objectionable noise notwithstanding that said trace of said head does not completely coincide with said one track, said step of stopping said tape at the predetermined position including changing the video tape recording and reproducing apparatus over from a reverse mode to a forward mode when a predetermined number of pulses produced by picking up said control signal have been counted, while continuing to count said pulses during any tape overrun, and advancing said tape to said predetermined position to compensate for said tape overrun, said step of advancing said tape including the step of running said tape forward at a speed slower than said normal speed;

running said tape forward, after the step of stopping the tape at said predetermined position, at said normal speed while measuring the advancement of said tape by counting said pulses as said tape is advanced; and then commencing the recording of said new video signal at a predetermined distance from the point where said tape had been stopped.

2. Apparatus for editing a video signal on tape in which a new video signal is recorded following an existing video signal previously recorded on the tape, comprising:

a video tape recording and reproducing device including tape drive means with a rotary capstan arrangement for driving said tape by rotation thereof for advancing the tape and having a forward mode, a pause mode, and a reverse mode in which said tape is driven forward, is stopped, and is driven reversely, respectively, a rotary video transducer traversing the tape for recording and reproducing video signals in parallel tracks disposed at an angle to the direction of advancement of the tape, said transducer defining a trace parallel to said tracks when the tape is advanced at normal speed and disposed at an angle to said tracks when said tape is held stationary, control signal transducer means for reproducing control signals recorded in a track on said tape in the direction of advancement thereof, and means for producing a pulse each time said tape is advanced a predetermined amount;

means for determining an edit position on said tape at which recording of the new video signal is to commence;

means for establishing said reverse mode when such position is determined;

means for counting occurrences of said pulses and establishing said stop mode when a predetermined number of said pulses have been counted, said means for counting including a first counter coupled to said control signal transducer means for counting occurrences of said control signal as said tape is advanced; and means for causing said tape drive means to bring said tape to a stop point, once said predetermined number of said pulses have been counted, at which said trace of the video transducer is substantially centered in respect to one of said tracks at a midpoint along the latter so that the existing video signal can be reproduced without objectionable noise, notwithstanding that said trace of said video transducer does not completely coincide with said one track, said means for causing said tape drive means to bring said tape to a stop point including a second counter coupled to said capstan arrangement for counting oscillations associated with said rotation of said capstan arrangement, and means for stopping said rotation of said capstan arrangement when said second counter has counted a predetermined number of said oscillations after said first counter has counted a predetermined number of occurrences of said control signal.

3. Apparatus for editing a video signal according to claim 2, wherein said means for causing said tape drive means to bring said tape to a stop point includes microprocessor circuitry having at least one interfacing circuit connected to said first and second counters to receive a signal therefrom related to the respective counted contents thereof and at least one further interfacing circuit providing a halt signal when it is determined that said second counter has counted said predetermined number of occurrences; switch means coupled to said tape drive means and receving said halt signal at a control input thereof; and stop circuit means coupled to said switch means to provide stopping current to said tape drive means when said switch means is switched over by said halt signal.

* * * * *